US009147108B2

(12) United States Patent
Su et al.

(10) Patent No.: US 9,147,108 B2
(45) Date of Patent: Sep. 29, 2015

(54) METHOD FOR CHECKING AN OPTICAL SECURITY FEATURE OF A VALUE DOCUMENT

(75) Inventors: Shanchuan Su, Neubiberg (DE); Norbert Holl, Germering (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 200 days.

(21) Appl. No.: 13/822,344

(22) PCT Filed: Oct. 7, 2011

(86) PCT No.: PCT/EP2011/005025
§ 371 (c)(1), (2), (4) Date: Mar. 12, 2013

(87) PCT Pub. No.: WO2012/045472
PCT Pub. Date: Apr. 12, 2012

(65) Prior Publication Data

US 2013/0170747 A1 Jul. 4, 2013

(30) Foreign Application Priority Data

Oct. 8, 2010 (DE) ........................ 10 2010 047 948

(51) Int. Cl.
*G06K 9/00* (2006.01)
*G07D 7/12* (2006.01)
*G07D 7/20* (2006.01)

(52) U.S. Cl.
CPC ............ *G06K 9/00442* (2013.01); *G07D 7/122* (2013.01); *G07D 7/205* (2013.01); *G07D 7/2041* (2013.01)

(58) Field of Classification Search
CPC ..... G07D 7/2041; G07D 7/122; G07D 7/205; G07D 7/0006; G07D 7/12; G06K 9/00442
See application file for complete search history.

(56) References Cited

U.S. PATENT DOCUMENTS 4,618,257 A 10/1986 Bayne et al.
5,931,277 A 8/1999 Allan et al.

(Continued)

FOREIGN PATENT DOCUMENTS

DE 102006053788 A1 5/2008
EP 1722335 A1 11/2006

OTHER PUBLICATIONS

German Search report for DE 102010047948.9, dated Jul. 5, 2011.

(Continued)

*Primary Examiner* — Jingge Wu
(74) *Attorney, Agent, or Firm* — Workman Nydegger

(57) ABSTRACT

A method for checking a prescribed optical security feature on a prescribed portion of a value document based on pixel data of pixels of an image of the portion which are associated with places on the portion and render optical properties of the value document at the places. A check is made of whether a first number of those pixels whose pixel data, according to a first prescribed criterion, lie within a first reference region prescribed for the security feature exceeds a first minimum hit value prescribed for the security feature, and whether a first scatter of the pixel data of the pixels exceeds a first minimum scatter value prescribed for the security feature. An authenticity signal is formed which represents an indication of authenticity only when the first number exceeds the first minimum hit value, and the scatter the first minimum scatter value.

22 Claims, 11 Drawing Sheets

(56) References Cited

U.S. PATENT DOCUMENTS

| | | | | |
|---|---|---|---|---|
| 6,516,078 | B1 | 2/2003 | Yang et al. | |
| 6,621,916 | B1 * | 9/2003 | Smith et al. | 382/112 |
| 2002/0117375 | A1 * | 8/2002 | Baudat et al. | 194/302 |
| 2005/0100204 | A1 * | 5/2005 | Afzal et al. | 382/135 |
| 2008/0283451 | A1 * | 11/2008 | Holl et al. | 209/534 |
| 2009/0245590 | A1 | 10/2009 | Holl et al. | |
| 2011/0121203 | A1 * | 5/2011 | Rapoport et al. | 250/459.1 |

OTHER PUBLICATIONS

PCT International Preliminary Report on Patentability (in English), dated Apr. 9, 2013.

* cited by examiner

METHOD FOR CHECKING AN OPTICAL SECURITY FEATURE OF A VALUE DOCUMENT

BACKGROUND OF THE INVENTION

A. Field of the Invention

The present invention relates to a method for checking an optical security feature in or on a portion of a value document on the basis of pixel data of an image of the portion, to a method for checking an optical security feature of a value document, and to an apparatus for checking an optical security feature of a value document.

B. Related Art

Value documents are understood here to be card- and preferably sheet-shaped objects that represent for example a monetary value or an authorization and hence should not be producible arbitrarily by unauthorized persons. They hence have security features that are not simple to produce, in particular to copy, whose presence is an indication of authenticity, i.e. manufacture by an authorized body. Important examples of such value documents are identity documents, chip cards, coupons, vouchers, checks and in particular bank notes.

Of special interest are optical security features, which are understood within the framework of the present invention to be security features of a value document that show characteristic optical properties upon interaction with optical radiation, i.e. electromagnetic radiation in the infrared, ultraviolet or visible spectral region. The optical properties can be in particular remission properties and/or transmission properties and/or luminescence properties.

Certain types of security features, hereinafter also designated as human features, are intended to be checkable for authenticity without any technical aids. Examples of such security features are in particular so-called OVD features, which will hereinafter be understood to be security features that show viewing angle-dependent visual effects or whose optical properties, for example the color, depend on the viewing angle. Such security features can convey a different pictorial impression to a viewer from different viewing angles, showing for example a different color impression or brightness impression and/or a different graphic motif depending on the viewing angle.

Value documents having such optical security features must be checked by machine for whether they are authentic. Because forgeries of value documents are becoming ever better in the course of time, it is necessary to improve the check of the authenticity of security features on value documents ever further. In so doing, the complexity of the equipment should be kept low, however.

SUMMARY OF THE DISCLOSURE

The present invention is hence based on the object of stating methods for checking optical security features, preferably OVD security features, of value documents that allow an exact check, as well as means for carrying out the method.

This object is firstly achieved by a method for checking, preferably in computer-aided fashion, a prescribed optical security feature in or on a prescribed portion of a value document on the basis of pixel data of pixels of a locally resolved image of the prescribed portion, which are respectively associated with places in or on the portion and render optical properties of the value document at the places. In the method, it is checked whether a first number of those pixels, or a first share of those pixels in the pixels of the image, whose pixel data, according to a first criterion prescribed for the security feature, lie within a first reference region for the pixel data that is prescribed for the security feature exceeds a first minimum hit value prescribed for the security feature, and whether a scatter of the pixel data of those pixels lying within the first reference region according to the first criterion exceeds a first minimum scatter value prescribed for the security feature, and there is formed in dependence on the result of the check an authenticity signal which represents an indication of authenticity only when the first number or first share exceeds the first minimum hit value, and the scatter the first minimum scatter value, according to the authenticity criterion, i.e. according to the first criterion.

The object is secondly achieved by a method for checking a prescribed optical security feature in or on a prescribed portion of a value document, wherein, for capturing an image of the prescribed portion, the value document is illuminated with optical radiation of an optical radiation source, and radiation emanating from the value document is captured with a capture device, there are formed, in dependence on the captured radiation, pixel data of pixels of the image which are respectively associated with places in or on the portion and render optical properties of the value document at the places, and wherein a method according to any of the preceding claims is carried out wherein there are employed as pixel data said formed pixel data.

In the methods, there are employed pixel data of pixels of an image of the prescribed portion of a value document in or on which the security feature is formed in an authentic value document. The position and form of the portion can hence conform to the position of the security feature on an authentic value document or the form of the security feature. The portion can be prescribed in particular for a certain type of value document to be checked, in the case of bank notes in particular a currency and face value or denomination of the bank notes, and the prescribed security feature to be checked. The portion can be given for example by the area of the security feature or only a prescribed part of the area occupied by the security feature. The image can be in particular a partial image of a total image of the total value document.

The pixel data of a respective pixel render optical properties at a place, associated with the respective pixel, in the portion of the value document. The pixel data for a respective pixel can in general have several components which represent different optical properties.

For checking the security feature, two partial checks are used: On the one hand, it is checked whether the pixel data lie within the first reference region which is prescribed for the security feature. For this purpose there is employed the prescribed first criterion for the pixel data, by means of which the position of the pixel data with respect to the first reference region is ascertainable. It is thus checked whether the optical properties of the analyzed portion of the value document lie within prescribed limits which are prescribed for the security feature. On the other hand, it is checked whether the scatter of the pixel data within the first reference region exceeds the first minimum scatter value prescribed for the security feature. This means that it is checked whether the pixel data in the first reference region are concentrated only in a part of the first reference region or are rather distributed in a wider scatter therein.

In dependence on the result of the check, the authenticity signal is then formed. This signal renders or represents, for example through its shape or its level, in the case of a data signal in particular its content, whether or not the check has yielded an indication of authenticity. In particular, it represents an indication of authenticity only when the first number or first share exceeds the first minimum hit value, and the scatter the first minimum scatter value. The authenticity signal can be employed for immediate further processing or for storage of an indication of authenticity or for its absence in a storage device. The indication of authenticity can be employed as a criterion for authenticity alone upon the further check of the security feature or value document, so that the security feature or value document is classified as authentic in the presence of the indication of authenticity. However, it is also possible, in particular when checking value documents having altogether at least two different security features, that the authenticity signal is merged with other authenticity signals into a total criterion; then the indication of authenticity is employed, where applicable, only as a necessary criterion or necessary condition for authenticity, or its absence as a condition for the presence of a forgery.

Although the number of pixels of the image only needs to be greater than 5, it is preferably greater than 48, so that the share or the number of pixels in the first reference region and their scatter therein are informative.

Thus it is made possible to check optical security features that are characterized by a scatter of optical properties within a prescribed region, which scatter is characteristic of the security feature and cannot be forged easily, for example by copying with a color copier or printing with a laser printer. In particular, in the method the security feature can be an OVD security feature, i.e. in particular, the method can be employed for checking OVD security features.

According to a preferred embodiment, the security feature can be an OVD security feature which can be obtained by printing with a printing ink having pigments, whose remission properties are shaped by the direction of incidence of optical radiation on a respective pigment particle. Such printing inks are also designated as “optically variable inks”, hereinafter also as “optically variable printing inks”. A security feature with optically variable printing inks, also designated as an OVI feature, is in particular also understood to be a security feature that is printed with a printing ink containing pigments whose color depends on the direction of illumination and the direction of detection or observation.

According to another embodiment, the security feature can be a surface structure formed in the value document, in particular an embossed structure, with a print formed on certain flanks of the surface structure or embossed structure, said structure having an optically variable effect. An optically variable effect is understood within the framework of the present invention to be an effect by which prescribed optical properties of a structure or of a security feature depend on the direction from which said structure or security feature is viewed, and/or the direction from which said structure or security feature is illuminated for viewing; in particular, the optical properties can be colors. Such surface structures in the form of embossed structures are described in the applications WO 97/17211 A1, WO 02/20280 A1, WO 2004/022355 A2, WO 2006/018232 A1 from the applicant. Preferably, the surface structure, preferably embossed structure, possesses, in the portion, bent or angled embossed structure elements which bring about a distribution of the optical properties that is difficult to forge.

In the first method, the check is effected employing a suitable apparatus, preferably in computer-aided fashion; “computer-aided checking” is understood within the framework of the present invention to be any check with a computer. A computer is understood within the framework of this invention to be, in general, a data processing device that processes the pixel data. In particular, the data processing device can comprise for this purpose an FPGA, a microcontroller or microprocessor, in particular also a DSP, or a combination of these components, or have only one of these components. Further, it can comprise a memory which stores a program upon whose execution on the computer the first method according to the invention is executed.

The subject matter of the invention is hence also a computer program with program code means for carrying out the first method according to the invention when the program is executed on a computer.

The subject matter of the invention is also a computer program product with program code means which are stored on a computer-readable data carrier for carrying out the first method according to the invention when the computer program product is executed on a computer.

In principle, it may be sufficient to perform only the stated partial checks. However, it is preferably checked additionally whether a second number of those pixels, or a second share of those pixels in the pixels of the image, whose pixel data, according to a second criterion prescribed for the security feature, lie within a second reference region prescribed for the security feature exceeds a second minimum hit value prescribed for the security feature. The authenticity signal can then be so formed that it represents the indication of authenticity only when additionally the second number or second share exceeds the second minimum hit value. This variant offers the advantage of making a more differentiated check of the security feature possible.

In a preferred development, it can be checked whether a scatter of the pixel data of those pixels lying within the second reference region according to the second criterion exceeds a second minimum scatter value prescribed for the security feature. The authenticity signal can then be so formed that it represents the indication of authenticity only when additionally the scatter of the pixel data in the second reference region exceeds the second minimum scatter value. This embodiment allows in particular the check of security features having at least two different characteristically scattering optical properties.

The pixel data can render in principle arbitrary optical properties and have for this purpose a corresponding number of components for each place which represent the optical properties. Although the number of components is in principle not limited, it is preferably less than six.

In a first embodiment, the pixel data for a respective pixel or place have components that render remission or transmission properties in at least two, preferably three, different wavelength ranges, preferably within the visible spectral region, or at least two, preferably three, colors. For this purpose, the illuminating with optical radiation and the capturing of radiation can be so effected that the pixel data for a respective pixel or place have the stated components. Upon a representation of colors, preferably at least two, better three, color components are employed, although color representations in higher-dimensional color spaces are also possible. In particular, in one variant the pixel data need not have any further components apart from color components in a three-dimensional color space. This allows a fast execution of the check.

In a second embodiment, the pixel data for a respective pixel or place have components that represent remission and/or transmission properties in at least two, preferably at least three, different wavelength ranges within the visible spectral region or at least two, preferably at least three, colors, and remission and/or transmission properties in a further wavelength range at least partly outside the visible spectral region, preferably in the infrared spectral region. For this purpose, the illuminating with optical radiation and the capturing of radiation can be so effected that the pixel data for a respective pixel or place have the stated components. The employment of such pixel data allows in particular a check of security features that are also characterized by characteristic properties in the non-visible optical spectral region. Upon a representation of colors, the at least two, or better three, color components are preferably employed here too. In particular, in one variant the pixel data need not have any further components apart from color components in a two- or three-dimensional color space and a component for the optical properties in the non-visible spectral region. This allows a fast execution of the check.

In these two embodiments, when the pixel data comprise color data or color components, there can in principle be employed as color data color values in an arbitrary color space. For example, there can be employed as a color space an RGB or HSI color space. Preferably, however, those pixel data representing properties in the visible spectral range or color values are transformed, before checking, into a device-independent color space, preferably a Lab or Luv color space, particularly preferably a CIE Lab or CIE Luv color space, if they are not already present in such a color space, or there are employed, as pixel data representing properties in the visible spectral range or color values, pixel data in a device-independent color space, preferably a Lab or Luv color space. This, on the one hand, offers the advantage of making possible an especially simple adaptation of the method to different sensors by means of which the pixel data are respectively captured; on the other hand, the first or the second criterion can be ascertained more simply.

For checking whether the number of pixels or the share of pixels in a respective reference region exceeds the minimum hit value, there can for example be ascertained a hit measure which renders the number of those pixels of the image, or the share of those pixels of the image, lying, according to the criterion prescribed for the security feature, in at least one reference region for the pixel data that is prescribed for the security feature. The hit measure can be given by the share or number or a function of the share or number that is monotonic in the region of the expected values of the share or number. In particular, at a prescribed resolution of the image, the share will be proportional to the number. Which of the alternatives is used depends, inter alia, on the reference-region dimension determined by the security feature, and the nature of the check.

For checking whether the respective scatter of the pixel data within the respective reference region is greater than the respective minimum scatter value, there can be ascertained a respective scatter measure which represents a scatter of the pixel data in the respective reference region or of prescribed components of the pixel data in the respective reference region. It hence states whether the pixel data or components are concentrated in a part of the reference region or are rather distributed in a wider scatter therein.

There can then be checked an authenticity criterion that renders whether, on the one hand, the first number represented by the first hit measure, or the first share represented by the first hit measure, exceeds a first minimum hit value prescribed for the security feature and, on the other hand, the scatter represented by the first scatter measure exceeds a first minimum scatter value prescribed for the security feature. These minimum values can be ascertained for example by measurements on authentic value documents. The authenticity criterion can be formulated differently here in dependence on the nature of the measures. If a measure is a monotonically increasing function of the share or number or scatter, it can be checked for example whether the measure exceeds the corresponding minimum value. If a measure is a monotonically decreasing function of the share or number or scatter, however, it can be checked for example whether the measure undershoots a limiting value corresponding to the minimum value. Thus, if for example the reciprocal value of the first number is employed as the first hit measure, the authenticity criterion is fulfilled when the hit measure undershoots a reciprocal value of the minimum value which would have to be exceeded when employing the number as a hit measure.

When checking whether the second minimum hit value or the second minimum scatter value is exceeded, one can proceed analogously. The authenticity signal is then so formed that it additionally renders whether the second number represented by the second hit measure, or the second share represented by the second hit measure, exceeds a prescribed second minimum hit value and, if employed, the scatter represented by the second scatter measure exceeds a prescribed second minimum scatter value. The authenticity signal can then be so formed that it represents a proof of authenticity additionally only when additionally the second number or second share exceeds the second minimum hit value and, if employed, the scatter the second minimum scatter value.

The first and, where applicable, second reference region and the first or second criterion by means of which it is checked whether pixel data lie within the respective reference region can be interdependent. In particular, the reference region can be given implicitly by the respective criterion.

The first and/or, if employed, the second criterion for ascertaining whether pixel data lie within the first and/or, if employed, second reference region can provide for example that, in the case of pixel data with n components, the reference region is also n-dimensional and accordingly the pixel data of a pixel lie in the reference region when the point given by the n components lies in the reference region. In this connection, n is a natural number greater than 1. The first and/or, if employed, the second criterion for ascertaining whether pixel data lie within the first and/or, if employed, second reference region can, however, for example also provide that pixel data lie in a reference region when only at least two prescribed components of the available components lie within an accordingly low-dimensional reference region.

In particular, when employing pixel data that render colors, there can preferably be employed as the first reference region a region extending at least in a plane of a color space or lying in a plane of the color space which extends parallel to two axes of the color space which correspond to different colors. The region can thus be given by a domain in the plane, i.e. extend only in the plane, or be at least three-dimensional and intersect the plane, the intersection in the plane being a domain. The area of the domain in the plane here is finite and greater then 0. In particular, when employing a Lab or Luv color space, the plane can be the a-b or u-v plane. This embodiment allows the check of security features that show a color-shift effect dependent on the viewing angle, preferably of OVD security features, in particular.

Alternatively or additionally, in the event that the pixel data also render at least one optical property outside the visible spectrum, there can be employed as the first or second reference region a region extending at least in a plane which extends parallel to an axis corresponding to a luminance or brightness in a, or the, color space and an axis corresponding to a brightness or intensity in the further wavelength range at least partly outside the visible spectral region. The term "extend" is understood here analogously to the term "extend" in the previous paragraph. Luminance or brightness is understood to be for example the L component when using a Lab or Luv color space.

For characterizing the scatter or as a scatter measure there can be employed in principle arbitrary quantities that render the scatter in the respective reference region. Preferably, there is employed a scatter of those components of the pixel data that are also employed for the check of whether pixel data lie in the respective reference region and that lie within the respective reference region. In a preferred embodiment, the scatter of all these components is employed. For example, there can be employed as the first and/or second scatter measure or first and/or second scatter a variance and/or a covariance of the pixel data lying in the first or second reference region, or components of the pixel data or a monotonic function of the variance or covariance.

However, it is also possible that there is employed as the scatter a scatter of the projection of the pixel data or pixel data components in the reference region onto a prescribed direction of the reference region. In this case, there can be employed for example as the scatter measure the variance of these projected data. Preferably, it is prescribed as the direction that direction in the reference region along which the greatest scatter is to be expected for authentic value documents. This direction can be ascertained by analyzing authentic value documents as a reference. If the reference region has for example the form of an ellipse or an ellipsoid, the longest principal axis of the ellipse or ellipsoid can be employed.

Value documents can become soiled during their use. The soiling can then hinder the check of optical security features. Preferably, there are hence employed, in the method, edge image pixel data of pixels of an edge image portion which are respectively associated with places within a prescribed edge region along at least a part of an edge of the portion with the security feature, there is ascertained from the edge image pixel data a local condition value rendering the condition of the value document in the portion, and the local condition value is employed upon the checking of the first and/or second share or first and/or second number and/or the first and/or second scatter.

For obtaining the edge image pixel data, there are preferably formed, upon the capture of the radiation emanating from the value document, edge image pixel data which respectively correspond to places in the edge region and render optical properties of the value document at these places. The edge region bordering on the portion can be prescribed in principle in an arbitrary way, but is always smaller than the value document. For example, there can be employed edge pixel data of pixels which are associated with places within a prescribed distance from an edge of the portion. The edge region is then a strip of constant width along the portion of the value document. The distance can be chosen in dependence on the properties, in particular the resolving power, of the sensor employed for forming the edge image pixel data. Preferably, it lies in a range between 5 mm and 1 mm or in a range corresponding to 2 to 20 pixels, particularly preferably 2 to 10 pixels. The edge of the portion can also lie within a security feature if the portion has "holes". Alternatively, the edge region can be given by the edge portion having a prescribed form and position and the image portion being located within the edge portion. In this case, too, the edge region is smaller than the total image of the value document. For example, the edge image portion could be given by the region between an outer rectangle surrounding the image portion employed for checking the security feature, and the edge of the image portion. If pixels outside the edge image portion are also employed for ascertaining the condition value, their share preferably lies under 10% of the pixels employed for ascertaining the condition value, particularly preferably under 1%. It is very particularly preferable, however, to employ only pixels from the edge image portion.

The condition is understood to be in particular also an optical condition which renders to what extent at least one prescribed optical property in the edge region of the value document to be checked deviates from the same optical property in the corresponding edge region of one or several prescribed, typically freshly printed, reference value documents. The local condition value formed from the edge image pixel data can be formed in principle by means of an arbitrary function, but preferably the ascertainment is so effected that only few discrete values are employed. Upon the ascertainment of the local condition value there can be employed for example methods for recognizing stains by means of which the condition in the edge region corresponding to the edge image region can be ascertained; on the basis of this result the local condition or local condition value for the portion with the security feature can then be estimated by prescribed methods. In the simplest case, the estimate is given by the condition in the edge region being transferred to the portion. The condition-value ascertainment needs in principle only to be effected before the check of the criterion of whether pixel data of a pixel lie in the reference region, but can otherwise be carried out in an arbitrary suitable phase of the method. As an essential difference to known methods for ascertaining an optical condition of value documents, by which the total condition of the value document is ascertained, it is checked here how the condition in the region of the security feature is. A value document in which only a small security feature is soiled can readily still have a total condition that, according to known methods, is substantially better than that in the region of the security feature. The employment of an only local condition value for the authenticity check of the security feature hence makes possible a substantially more selective and more exact check of the security feature.

The employment of local condition values for checking security features is also employable more generally, however. The subject matter of the present invention is hence also a method for computer-aided checking of a prescribed security feature in or on a prescribed portion of a value document, wherein a local condition value for the portion is ascertained in dependence on properties of the value document at places lying within a prescribed edge region along at least a part of an edge of the portion or security feature, preferably within a prescribed distance from the edge of the portion or security feature, and an authenticity or forgery criterion for the presence of an authentic security feature or a forgery is checked in dependence on properties of the value document at places in the portion and on the local condition value. In dependence on the result of the check, a corresponding signal can then be formed or a value stored in a memory. The remarks on the condition value and the edge region above, in particular in the preceding two paragraphs, also apply to this subject matter.

Preferably, the pixels of the edge image portion, or the places where properties are employed for ascertaining the condition value, are distributed uniformly along the edge of the portion.

The employment of the local condition value upon checking can basically be effected arbitrarily. According to one embodiment, the pixel data can be corrected before checking the number or share and the scatter. A correction can be effected in particular through a transformation of the pixel data which depends on the local condition value.

Alternatively or additionally, the first criterion and/or the first reference region and/or the second criterion and/or the second reference region can be changed or prescribed in dependence on the local condition value. The second possibility can, if there is enough memory space and only a low number of local condition values, allow the method to be carried out faster when parameters provided for the respective criterion and/or the reference region are stored in dependence on the possible local condition values.

The subject matter of the invention is also a checking device for checking a prescribed security feature of a value document by means of the method according to the invention, with an optical sensor for capturing an image with pixels whose pixel data are respectively associated with places in or on the portion and render optical properties of the value document at the places, a memory in which a computer program according to the invention is stored, and a computer for executing the computer program with images captured by the sensor.

The optical sensor can be configured in particular for locally resolved capture of remission and/or transmission properties, or remission or transmission images, in at least two, preferably three, different wavelength ranges, preferably within the visible spectral region, or at least two, preferably three, colors and forming pixel data rendering these properties.

Particularly preferably, the sensor is configured for locally resolved capture of the remission and/or transmission properties, or remission and/or transmission images, in at least two, preferably at least three, different wavelength ranges within the visible spectral region or at least two, preferably at least three, colors, and remission and/or transmission properties in a further wavelength range at least partly outside the visible spectral region, preferably in the infrared spectral region, and forming pixel data rendering these properties.

The method according to the invention has the advantage that no elaborate optical sensors are necessary for capturing the pixel data. Thus, there can preferably be employed for capturing the image or the pixel data a locally resolving sensor for capturing a color image, particularly preferably in addition for capturing an image in the non-visible, optical spectral region. Preferably, the value document can be transported past an illumination source which emits optical radiation which impinges on the value document as at least one ray bundle converging with regard to a convergence plane. A bundle of optical radiation that is convergent with regard to a convergence plane is understood here to be a ray bundle whose rays, projected onto the plane designated as a convergence plane, yield a convergent ray bundle in the plane. The convergence plane can extend parallel to the transport direction and orthogonally to the plane of the value document. The ray bundle emanating from the illumination device can also be split into at least two partial bundles which are thereafter directed at least partly onto the same region of the value document again.

Particularly preferably, the illumination device produces on the value document an illumination strip extending transversely to the transport direction, the optical radiation falling on the value document in non-parallel fashion is projected geometrically into a plane transverse to the transport direction and orthogonally onto a plane of the value document.

The value document can also be illuminated by the illumination device with a bundle of optical radiation that is convergent with regard to a convergence plane from only one illumination direction, and the radiation emanating from a respectively illuminated place be captured only from one capture direction. The illumination direction is understood to be the direction obtained by averaging over all rays of the bundle. Preferably, the illumination direction and/or the capture direction and/or the convergence plane enclose with a normal on a plane of the value document an angle smaller than 5°. This applies in particular when checking OVI security features. For checking security features having an embossed structure with a print formed on certain flanks of the embossed structure, it can be preferred that the illumination direction and/or the capture direction enclose with a normal on a plane of the value document an angle between 0°, preferably 5°, and 15°.

The elements causing the scatter of the optical properties in OVD security features or security features having a surface structure, preferably embossed structure with a print formed on certain flanks of the embossed structure, are normally very small. For the scatter to be capturable well nevertheless, the resolution of the image, in the methods, is preferably better than 0.4 mm×0.4 mm, particularly preferably better than 0.3 mm×0.3 mm.

DESCRIPTION OF THE DRAWINGS

The invention will hereinafter be explained further by way of example with reference to the drawings. There are shown.

DETAILED DESCRIPTION OF PREFERRED EMBODIMENTS

Figure 1:
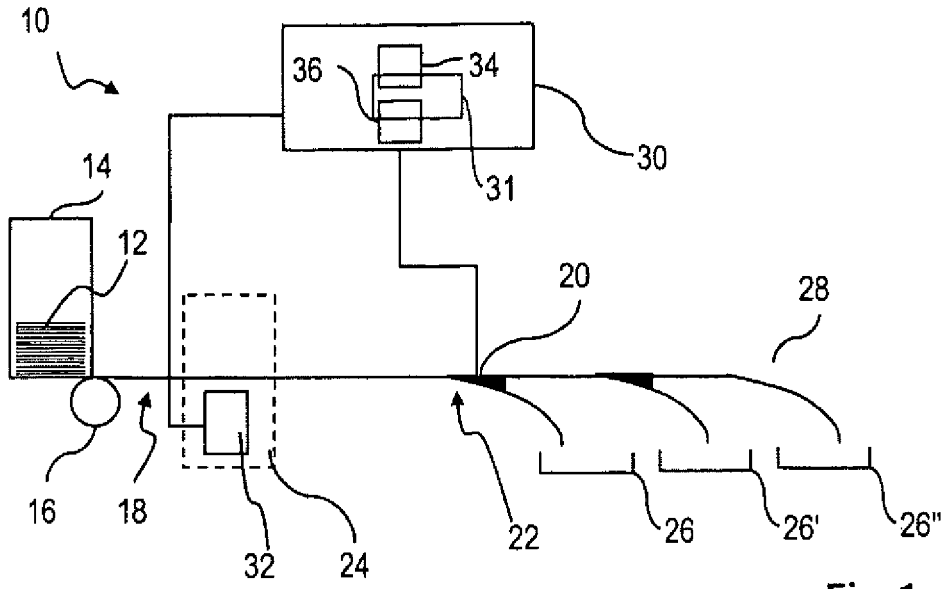
FIG. 1 a schematic representation of a value-document processing apparatus.

An apparatus 10 for processing value documents, in the example a bank-note processing apparatus, in FIG. 1 serves, inter alia, for checking the authenticity of value documents 12 in the form of bank notes and for sorting in dependence on the result of the authenticity check. The apparatus 10 has an input pocket 14 for the input of value documents 12 to be processed, a singler 16 which can access value documents 12 in the input pocket 14, a transport device 18 with gates 20 and 20' arranged successively along a transport path 22, and a respective output pocket 26 or 26' or 26" after each of the gates or at an end of the transport path 22 following the two gates. Along the transport path 22 given by the transport device 18 there is arranged before the gate 20 and after the singler 16 a sensor assembly 24 which serves for capturing properties of value documents 12 fed in singled form, and for forming sensor signals rendering the properties. A control device 30 is connected at least to the sensor assembly 24 and the gates 20 and 20' via signal connections and serves for evaluating sensor signals of the sensor assembly 24, in particular for checking authenticity, and for controlling at least the gates 20 and 20' in dependence on the result of the evaluation of the sensor signals.

The sensor assembly 24 comprises for this purpose at least one sensor; in this embodiment example there is only provided one optical sensor 32 for locally resolved capturing of color properties and IR properties, which captures optical radiation remitted by the value document. In other embodiment examples further sensors can also be provided, e.g. for properties other than optical ones.

While a value document is being transported past, the sensor 32 captures a total image of the value document in four spectral regions according to the three color channels, red, green and blue, and in the infrared spectral region (IR channel), which is represented by corresponding sensor signals.

From the analog and/or digital sensor signals of the sensor 32 there are ascertained by the control device 30, upon a sensor-signal evaluation, pixel data of pixels of the total image which are relevant for the check of the bank notes with respect to their authenticity. For this purpose, the control device 30 has an evaluation device 31 which is integrated into the control device 30 in this example, but in other embodiment examples can also be part of the sensor assembly 24, preferably of the sensor 32.

The control device 30 has, besides a corresponding interface for the sensor 32, a processor 34 and a memory 36 connected to the processor 34 and storing at least one computer program with program code upon whose execution the processor 34, in a first function as the evaluation device 31, evaluates the sensor signals, in particular for checking the authenticity and/or ascertaining a total condition of a checked value document, and, in so doing, executes, inter alia, a hereinafter described method while employing the sensor signals or the pixel data. In a second function, the processor controls the apparatus or, in accordance with the evaluation, the transport device 18. The evaluation device 31 hence constitutes a computer within the meaning of the present invention. The control device 30 further has a data interface 37.

During operation, the evaluation device 31, more precisely the processor 34 therein, can, after ascertainment of pixel data, check a prescribed criterion for the authenticity of the value document, into which at least some of the captured properties and reference data go.

In dependence on the ascertained authenticity, the control device 30, in particular the processor 34 therein, controls the transport device 18, more precisely the gates, such that the checked value document is transported into corresponding output pockets for storage in accordance with its ascertained authenticity.

For processing value documents 12, value documents 12 inserted into the input pocket 14 individually or as a stack are singled by the singler 16 and fed in singled form to the transport device 18 which feeds the singled value documents 12 to the sensor assembly 24. The latter captures optical properties of the value documents 12, in this example the color image with an additional IR channel, thereby forming sensor signals which render the corresponding properties of the value document. The control device 30 captures the sensor signals, ascertains in dependence thereon a condition and the authenticity of the respective value document, and controls the gates in dependence on the result such that the analyzed value documents are fed to the output pockets in accordance with their ascertained authenticity.

Figure 2A:
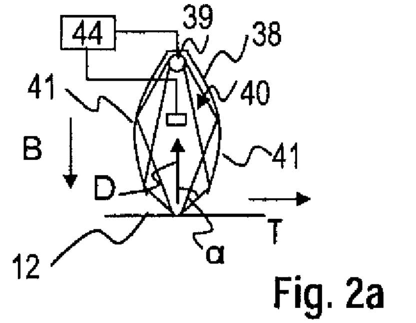
FIGS. 2*a* and *b* schematic representations of an optical sensor of the value-document processing apparatus in FIG. 1 transversely to a transport direction in which value documents are transported, and from above onto a transport plane in which value documents are transported, FIG. 3 a schematic representation of an example of a value document, in the form of a bank note, to be analyzed, FIG. 4 a schematic representation of an example of an optical security feature to be checked in the value document in FIG. 3, FIG. 5 a simplified flowchart for a first embodiment of a method for checking an optical security feature in or on a portion of a value document, which can be carried out in the value-document processing apparatus in FIG. 1 with the sensor in FIGS. 2*a* and 2*b*, FIG. 6 a simplified flowchart for a second embodiment of a method for checking an optical security feature in or on a portion of a value document, FIG. 7 a schematic representation of distributions of pixel data in an R-B plane and a G-IR plane for the security feature in FIG. 4, FIG. 8 a simplified flowchart for a third embodiment of a method for checking an optical security feature in or on a portion of a value document, FIG. 9 a simplified flowchart for a fourth embodiment of a method for checking an optical security feature in or on a portion of a value document, FIG. 10 a schematic representation of distributions of pixel data in an H-S plane and an I-IR plane for the security feature in FIG. 4, FIG. 11 a simplified flowchart for a further embodiment of a method for checking an optical security feature in or on a portion of a value document, FIG. 12 a simplified flowchart for yet a further embodiment of a method for checking an optical security feature in or on a portion of a value document, FIG. 13 a simplified flowchart for a further embodiment of a method for checking an optical security feature in or on a portion of a value document, and FIG. 14 a schematic representation of distributions of pixel data in an a-b plane and an L-IR plane for the security feature in FIG. 4.
Figure 2B:
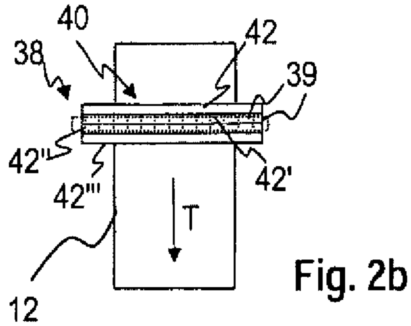

The sensor 32 is configured for capturing images for three colors and IR radiation. In this example, it is configured as a line sensor which, while a value document is being transported past the sensor 32, captures a sequence of line images which yield an image of the value document in a direction transverse to the direction of the line, i.e. in the transport direction. It comprises in the present example, schematically represented only in extremely simplified form in FIGS. **2*a* and 2*b*, an illumination device 38 for illuminating a strip extending transversely to the transport direction T, i.e. for producing an illumination strip, in a transport plane E (in FIG. 2*b* parallel to the drawing plane) for the value document 12 or in a plane of the value document 12 with convergent, white light and IR radiation, while the value document is being transported past, across its total extension transversely to the transport direction T. Further, the sensor 32 comprises a capture device 40 arranged in the ray bundle emitted by the illumination device 38, and shadowing a part of the radiation of the illumination device 38**.

To make possible an illumination direction B and a detection direction D orthogonal to a plane of the value document, the illumination device 38 has several radiation sources 39 for visible light and IR radiation arranged in line form transversely to the transport direction T, as well as two diverting elements 41 for concentrating the radiation onto a strip in a transport plane for the value document 12 or on the value document 12. As to be seen in FIG. **2*a*, the illumination device 38 produces a convergent ray bundle, projected onto a convergence plane extending orthogonally to the transport plane E (in FIG. 2*a* the drawing plane) and parallel to the transport direction T. The emitted ray bundle is thereby first divided by the capture device 40 into two partial bundles, which are merged to a convergent ray bundle again by the diverting devices 41**. The maximum cone angle $\alpha$ between a perpendicular to the transport plane or the detection direction D and the ray of the bundle that is outermost in the plane amounts here to at most 40°, preferably at most 30°. In a plane orthogonal to the transport direction T the rays are not strongly concentrated, however; instead the radiation is diffuse. The illumination direction B results as the average over the directions of all rays of the bundle and is substantially parallel to the detection direction D because of the symmetric course of the partial bundles.

As a capture device 40 there serve in this example four line-scan cameras 42, 42', 42", 42'" with red, green, blue and IR filters (not shown) arranged in the ray path before said cameras, for capturing red, green, blue and IR fractions of the optical radiation from the illumination device 38 that is remitted by the value document. Each of the line-scan cameras has a respective detector row with photodetection elements in a row-type arrangement, before which is respectively arranged the filter corresponding to the color fraction of the remitted optical radiation that is to be detected by the respective line-scan camera. The sensor 32 can also comprise further optical elements, in particular for imaging or focusing, which are not shown here. The detector rows of photodetection elements are arranged parallel to each other. The sensor 32 is hence so constructed and arranged that the value document is illuminated with optical radiation from a direction B orthogonally to the plane of the value document or parallel to a normal on the transport plane in which the value document is transported, and remitted optical radiation emanating from the value document 12 is captured from a direction D orthogonally to the plane of the value document or parallel to the illumination direction.

For capturing a color image of a value document 12, said document is transported past the sensor 32 at constant speed in the transport direction T, there being captured with the line-scan cameras 42, 42', 42" and 42''' at constant time intervals intensity data so as to be resolved in terms of place and color or spectral region. The intensity data constitute pixel data which describe the properties of pixels 44 of a line image which renders the line-shaped region of the value document 12 that is captured by the sensor 32. By placing the line images next to each other in accordance with the time sequence of capture, i.e. by corresponding association of the pixel data, there is then obtained a total image of the value document with pixels which respectively have pixel data associated therewith which render or represent optical properties of the value document, namely, color values for red, green, blue and the IR remission.

Figure 3:
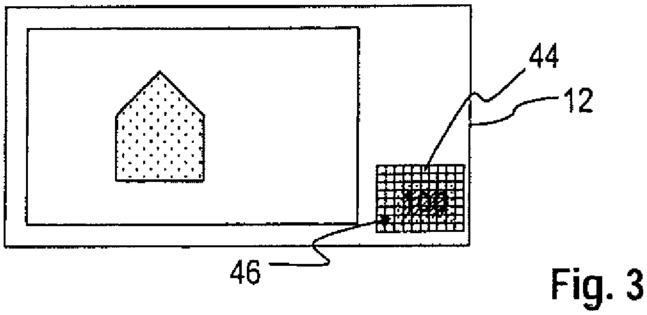

An image captured by the sensor 32 is hence composed of pixels arranged in a rectangular matrix and is described by the pixel data. In the illustration of the image of a value document 12 in FIG. 3 there are shown for clarity's sake only some of the pixels 44, which are moreover represented in greatly enlarged form. In this embodiment example, the resolution of the sensor 32 is at least so great that a pixel corresponds to an area of at most 0.3 mm×0.3 mm on the value document. Each of the pixels has associated therewith as pixel data, besides a number or numeral i which renders the position in the image, color values $r_i$, $g_i$, $b_i$ and $IR_i$ for red, green and blue and IR remission. It is assumed here that the signal processing device 44, after calibration, can produce, and does produce, RGB color values from detection signals of the detector rows 42, 42', 42" and 42'''. The property data can, for simpler representation, be combined into a vector V, given by the components $(i, r_i, g_i, b_i, IR_i)_{i=1,N}$, where N is the number of pixels.

For checking the value document, there is checked in this example, inter alia, an optical security feature 46 which is given in this example by the statement of value "100" in OVI print, i.e. as a security feature with optically variable printing ink. When a viewer tilts the value document in the suitable direction, he will recognize a change of color of the print or of the statement of value.

Figure 4:
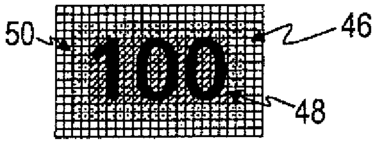
Figure 5:
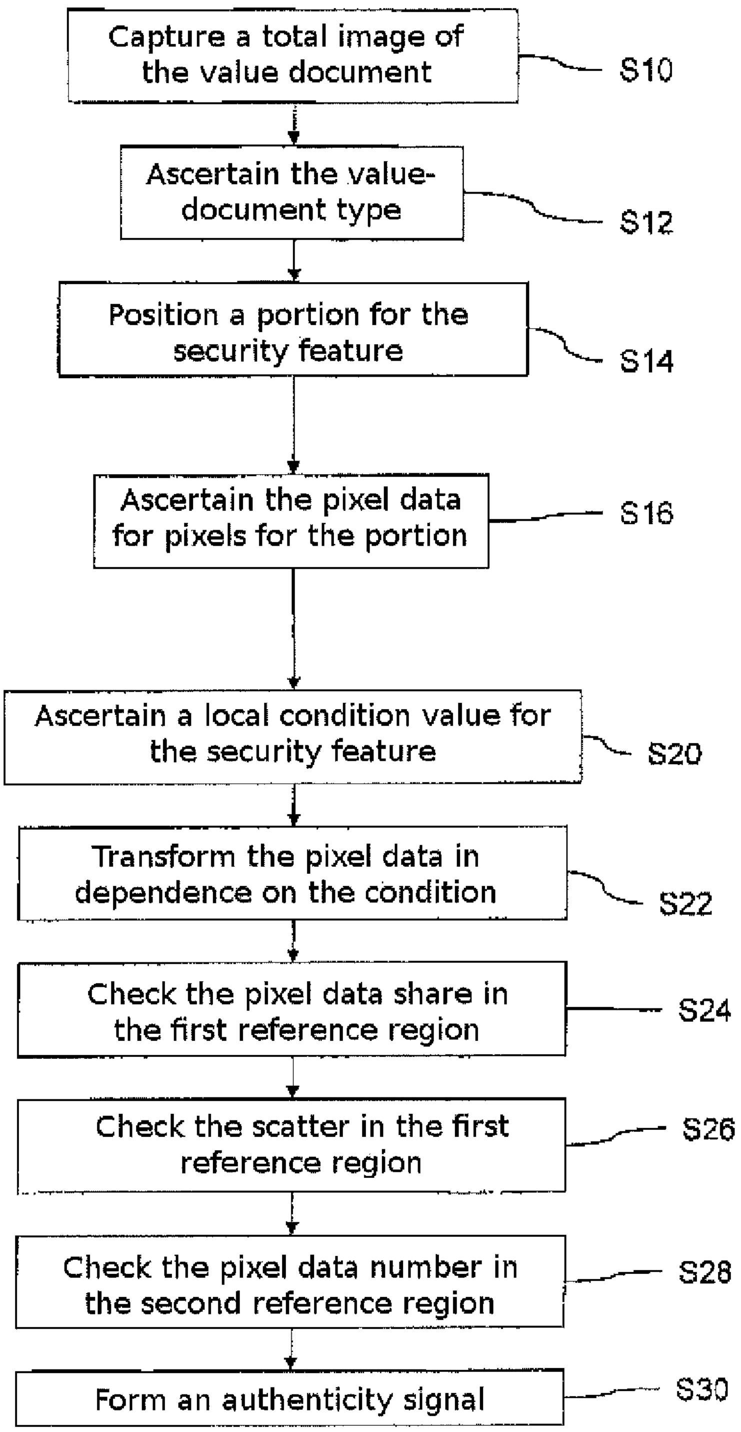

The actual security feature 46 is located in a value-document portion 48 which is marked by hatching in FIG. 4 and FIG. 5. In FIG. 5 the pixels are shown in a higher resolution than in FIG. 4, but do not represent real relations because of the schematic representation. Around the portion 48 there is marked an edge image portion 50 which is frame-like in this example and contains pixels which have the places in an edge region, given in this example by a distance from the edge of the portion 48 a distance of less than 2.5 mm, preferably a distance which correspond in the image to less than 8 pixels, in the example of 5 pixels; in the schematic representation of FIG. 4 there are only shown pixels at a distance of 2 pixels. The edge region thus also constitutes a region given by position and form, in the example rectangular form, in which the portion 48 is located.

For checking the value documents, there is stored in the memory 36 in a portion serving as part of the evaluation device 31, and thus in this example in the control device 30, a program which, upon execution by the evaluation device 31, i.e. here the processor 34, carries out the following steps of a method for checking value documents.

In step S10 the evaluation device 31 captures by means of the sensor 32 a total image of the value document to be checked.

In this example, the sensor 32 captures total images of the value documents, more precisely pixel or image data representing the total images, in the example full-area images with three color channels, namely, red, green and blue (RGB channels) and an IR remission value; the nature of the pixel data was described above. The pixel data thus state optical properties of the value document in dependence on the place on the value document. The pixel data are transmitted to the evaluation apparatus 31 and captured thereby. Depending on the nature of the sensor, a pre-processing of the captured data can also be carried out in the sensor 32 or the evaluation device 31 in this step, by which the image data are transformed, in particular filtered, for compensation of background noise, for example.

Thereupon the evaluation device 31 or the processor 34 ascertains in step S12, in dependence on the pixel data captured by means of the sensor 32, the type, i.e. the currency and the denomination, of a value document to be checked. Different types are prescribed here. The value document can then be assigned one of the prescribed types, if possible. In this example, value documents are to be checked whose format depends on the type. The evaluation device 31 can hence first carry out a search or recognition of edges of the bank note in the image. From the recognized edges it can ascertain the format of the value document, the denomination or face value and thus the type from the set of prescribed possible value-document types.

Thereafter the processor 34 or the evaluation device 31 ascertains in step S14, in dependence on the type of the value document, the position of the portion of the value document in which the optical security feature must be found in an authentic value document. The portion or the image of the portion is marked in FIG. 4 by hatching. For this purpose, the evaluation device 31 determines an evaluation region 48 or ROI (region of interest) in the image, which region corresponds to the portion prescribed for the security feature, and results from the known position of the security feature on authentic value documents of the prescribed type relative to the outlines of the value documents and an outline of the value document that is ascertained in the image. For this purpose, the evaluation apparatus 31 can in particular first carry out a search or recognition of edges of the value document in the total image or make use of results of the step S12, to then position the ROI in the total image, i.e. select corresponding pixel data, in dependence on the position of the edges in the total image.

From the total image the processor 34 then, in step S16, ascertains the pixel data of the pixels of the total image which correspond to places in this portion; this corresponds to an ascertainment of an image with the security element.

In step S20, the evaluation device 31 then ascertains a local condition value for the security feature 46 from edge pixel data of the edge image portion 50.

Through the capture of the total image there have been formed, upon the capture of the radiation emanating from the value document, edge image data of an edge image portion 50 which are respectively associated with places within the prescribed distance, which in this example corresponds to 5 pixels in the image, from an edge of the portion 48 outside the portion 48 and render optical properties of the value document at these places. In FIG. 5 the edge image portion or its pixels are marked by dotting.

These edge image pixel data of pixels of this edge image portion 50 which are respectively associated with places within the prescribed distance from the edge of the portion 48 are then employed by the processor 34 to ascertain—in this example, to estimate—from the edge pixel data a local condition value rendering the condition of the value document in the portion. This can be effected by the edge pixel data being compared with reference pixel data for a freshly printed value document of the same type according to a prescribed condition criterion. Methods for this purpose are basically known, and described for example in WO 2008/058742 A1 from the applicant, although they are described therein for the total value document as opposed to the present application; the content of WO 2008/058742 A1 is hereby incorporated into the description to this extent by reference. In particular, there can be employed for ascertaining the condition value for a respective type of value documents or for the security feature 46 a prescribed condition criterion for an adequately good condition, which criterion depends on pixel data for the edge image portion. This can be formulated generally such that a respective check function K ($P_j$, V) is prescribed which depends on prescribed criterion parameters $P_j$ (j=1, . . . , m) and a vector with the pixel data. If the function for a given vector V assumes a prescribed value, the condition criterion is regarded as fulfilled, otherwise it is not. A check of the condition criterion can thus consist in computing the value of the check function K for a given vector V and comparing it with a prescribed value G. If the value of K exceeds the value G, the condition criterion is fulfilled, otherwise it is not. The computation of the value of the check function is understood here to mean that the value is ascertained from the vector and the parameters by means of steps prescribed by the check function.

In the present case, the check is effected such that there are provided as local condition values only two discrete values, one of which is assigned as a local condition value to the security feature 46 or to the portion 48 depending on the condition in the edge image portion 50.

In this example, let the first of the possible local condition values characterize a condition corresponding to the security feature or the edge image portion of a freshly printed value document of the recognized type according to the prescribed condition criterion, and the second of the possible local condition values a soiled condition corresponding only to a change of the luminance of the color values, but not the chromaticity. In other embodiment examples, other conditions of soiling can also be taken into consideration, for example those showing discolorations.

In the step S22, the pixel data are then transformed or corrected in dependence on the local condition value. If the first condition value was ascertained, the pixel data are left unchanged, otherwise the luminance value of the pixel data as well as the IR component are multiplied by a prescribed factor.

In the steps S24 to S30, the evaluation device 31 then executes steps for the actual check of the security feature.

In the present example, there are employed for checking the security feature two reference regions in which pixel data should lie. The first reference region lies in the R-B plane of the RGB color space (cf. FIG. 6*a*), the second in a plane that is spanned by the G color values and the IR remission axis (cf. FIG. 6*b*).

In the present example, the reference regions and the parameters for the criteria were ascertained before execution of the method by capturing the pixel data for those pixels that are also employed upon the check, for a prescribed set of other freshly printed, authentic value documents of the type as reference documents. For these pixel data, for ascertaining the respective reference region and the respective criterion according to which pixel data lie within the respective reference region, there are then ascertained the mean values of the R-B components or G-IR components and their variances and covariances assuming a normal distribution. The first reference region and the first criterion are then given by ascertaining, for the pixel data of a pixel that are relevant for the first criterion, the R and B components, the Mahalanobis distance in the R-B plane, and checking whether the Mahalanobis distance is smaller than a prescribed first maximum distance value. The parameters for computing the Mahalanobis distance depend in the known way on the previously ascertained mean values, variances and the covariances. Accordingly, the maximum distance value was ascertained on the basis of the reference documents. Analogously, the second reference region and the second criterion are given by ascertaining, for pixel data of a pixel, here the G and IR components, the Mahalanobis distance in the G-IR plane that is dependent on the corresponding mean values, variances and covariances, and checking whether the Mahalanobis distance is smaller than a prescribed second maximum distance value which was ascertained for the reference value documents. As a hit measure for the share of the pixel data lying within the respective reference region, the share itself is respectively employed in the present example. Hence, for each of the reference regions there is specified a minimum hit value which must be exceeded by the hit measure, i.e. here the share of the pixel data in the respective reference region, and which is characteristic of an authentic security feature or an authentic value document. Such a minimum hit value can be ascertained by analyzing the reference value documents and, if already known, forged value documents with the forged security feature.

In other embodiment examples there can be employed, instead of the Mahalanobis distance, its square with a maximum square distance value.

In the present embodiment example, the scatter of the pixel data lying within the first reference region is additionally ascertained and compared with a minimum scatter value. As a scatter or scatter measure there is employed here the total variance, i.e. the sum of the variances of the R and the B component. For specifying the minimum scatter value, there is ascertained for each of the reference value documents, for the pixel data within the first reference region, as the first scatter measure the total variance, i.e. the sum of the variances of the R and the B component. From the distribution of the ascertained total variances there is then specified as the minimum scatter value a mean scatter value which must be exceeded by a first scatter measure ascertained for a security feature to be checked, in order that the security feature can be deemed authentic. Upon this specification there can also be employed the results for the scatter in forged value documents, if any are present.

For checking the security feature, the evaluation device 31 hence ascertains in step S24 which share of the pixel data for pixel corresponding to places in the portion 48 lie within the first reference region, by computing for each pixel the Mahalanobis distance in the R-B plane and comparing it with the maximum distance value. If the Mahalanobis distance is smaller than or equal to the maximum distance value, the pixel data lie in the first reference region, otherwise outside. After ascertaining the share, the share is compared with the prescribed first minimum hit value.

In the step S26, the evaluation device 31 or the processor 34 checks whether a first scatter of the pixel data lying within the first reference region is greater than a prescribed minimum scatter value. This sum is compared with the prescribed first minimum scatter value.

In step S28, the evaluation device 31 or the processor 34 then ascertains in accordance with step S24 the share of those pixel data of the pixels employed for checking the security feature, i.e. of the pixels in the portion 48, that lie within the second reference region, by respectively checking for the pixel data of a respective one of the pixels whether the Mahalanobis distance in the G-IR plane is smaller than the corresponding second maximum distance value. When the share is ascertained, the processor 34 checks whether it exceeds the corresponding second minimum hit value.

In step S30, the evaluation device 31 or the processor 34 forms in dependence on the checks in the steps S24 to S28 an authenticity signal which renders, for example through its level or its shape, an indication of authenticity, i.e. whether or not the security feature is regarded as authentic. With the authenticity signal a corresponding value is stored in the memory 36. The authenticity signal is so formed that it represents an indication of authenticity only when the first number or first share exceeds the first minimum hit value, the first scatter the first minimum scatter value, and the second share the second minimum hit value.

Figure 6:
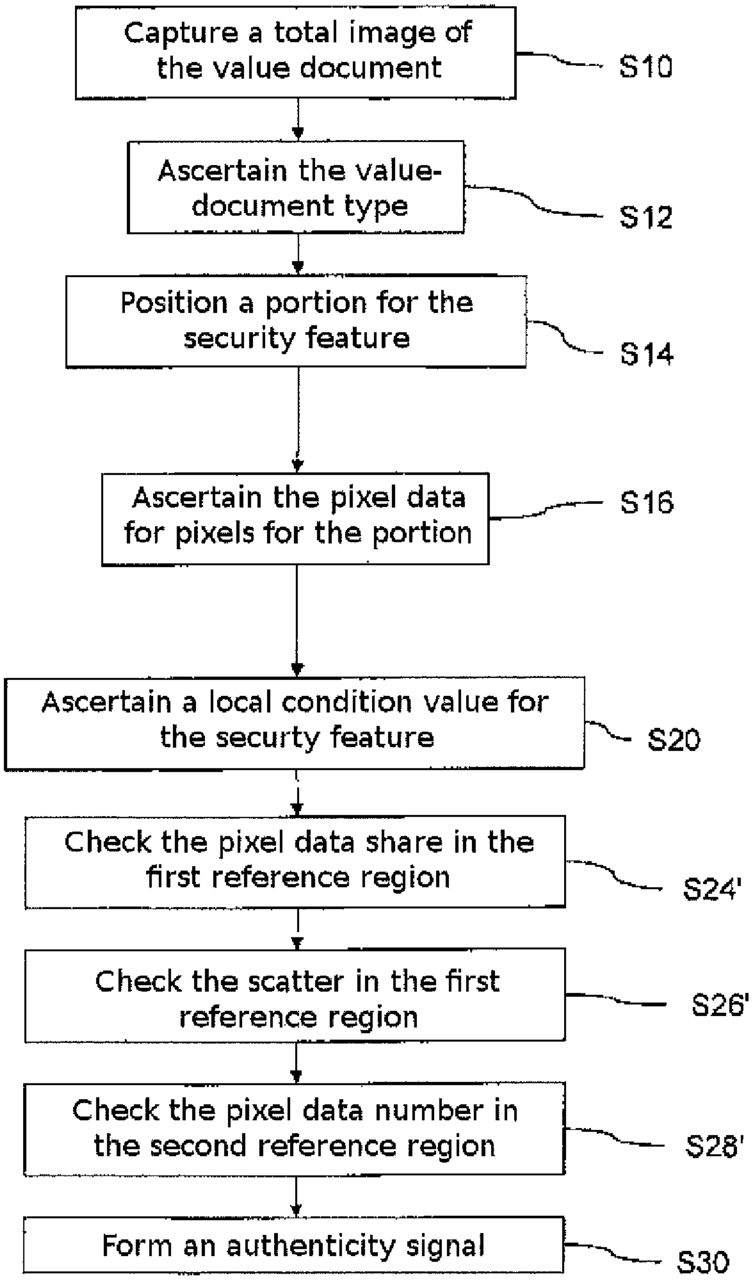

A second embodiment example in FIG. 6 differs from the first embodiment example in that the step S22 is omitted and instead the steps S24 to S28 are replaced by steps S24' to S28'.

These steps S24' to S28' differ from the steps S24 and S28 only in that the parameters for the first and second criteria, and the first and second reference regions, are set in dependence on the local condition value. In particular, the parameters for determining the Mahalanobis distance, i.e. in particular the mean values, variances and covariances, can be functions of the local condition value. In this example, the local condition value can assume only two values, so that for each of the condition values only a corresponding parameter set needs to be stored; in dependence on the local condition value ascertained for the portion the respective parameter set is then employed.

Figure 7:
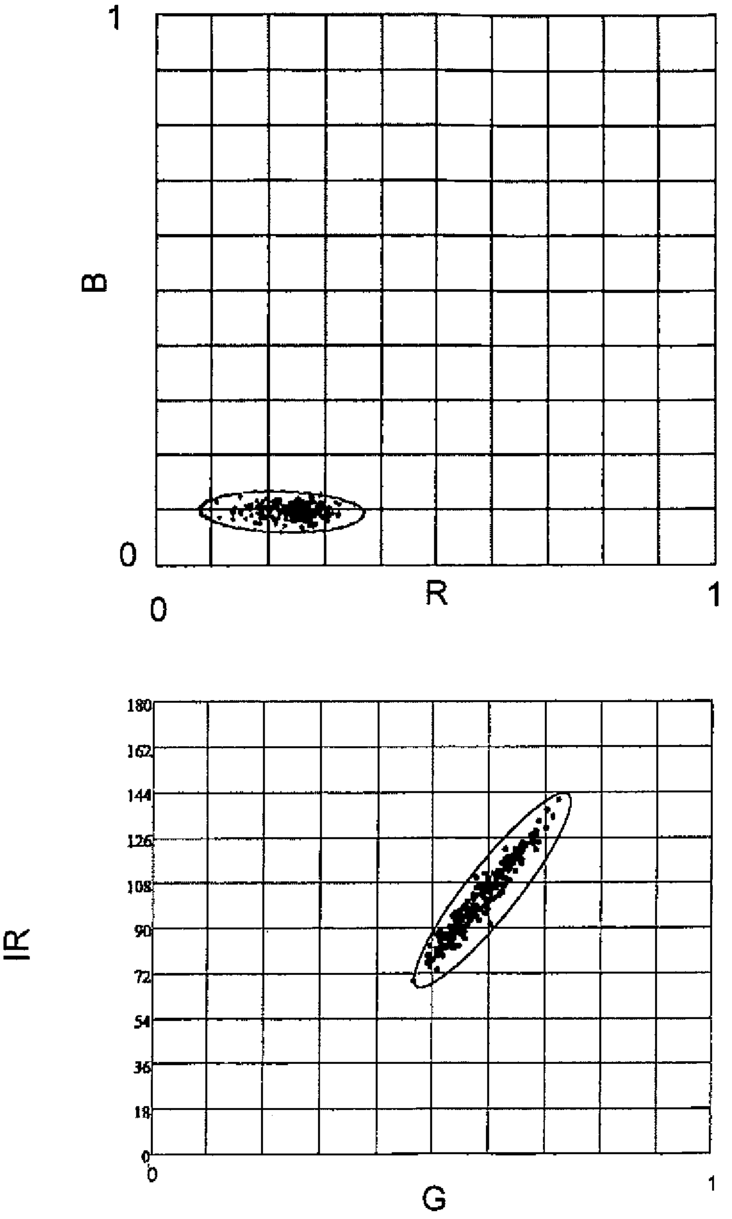

A basis of the methods in FIGS. 5 and 6 is illustrated in FIG. 7. Shown there for a bank note are the distributions of pixel data of pixels corresponding to an OVI region or a security feature with optically variable printing ink, in the R-B color plane and the G-IR plane. One can see a scatter, which is typical of the OVI element or the security feature with optically variable printing ink, of the pixel data lying within an elliptical curve which represents a curve of equal Mahalanobis distances. If a normal copier color were employed for forging the security feature, there could maybe result pixel data having the same mean value in the R-B plane, but not the characteristic scatter. The same holds in this example for the pixel data in the G-IR plane.

Figure 8:
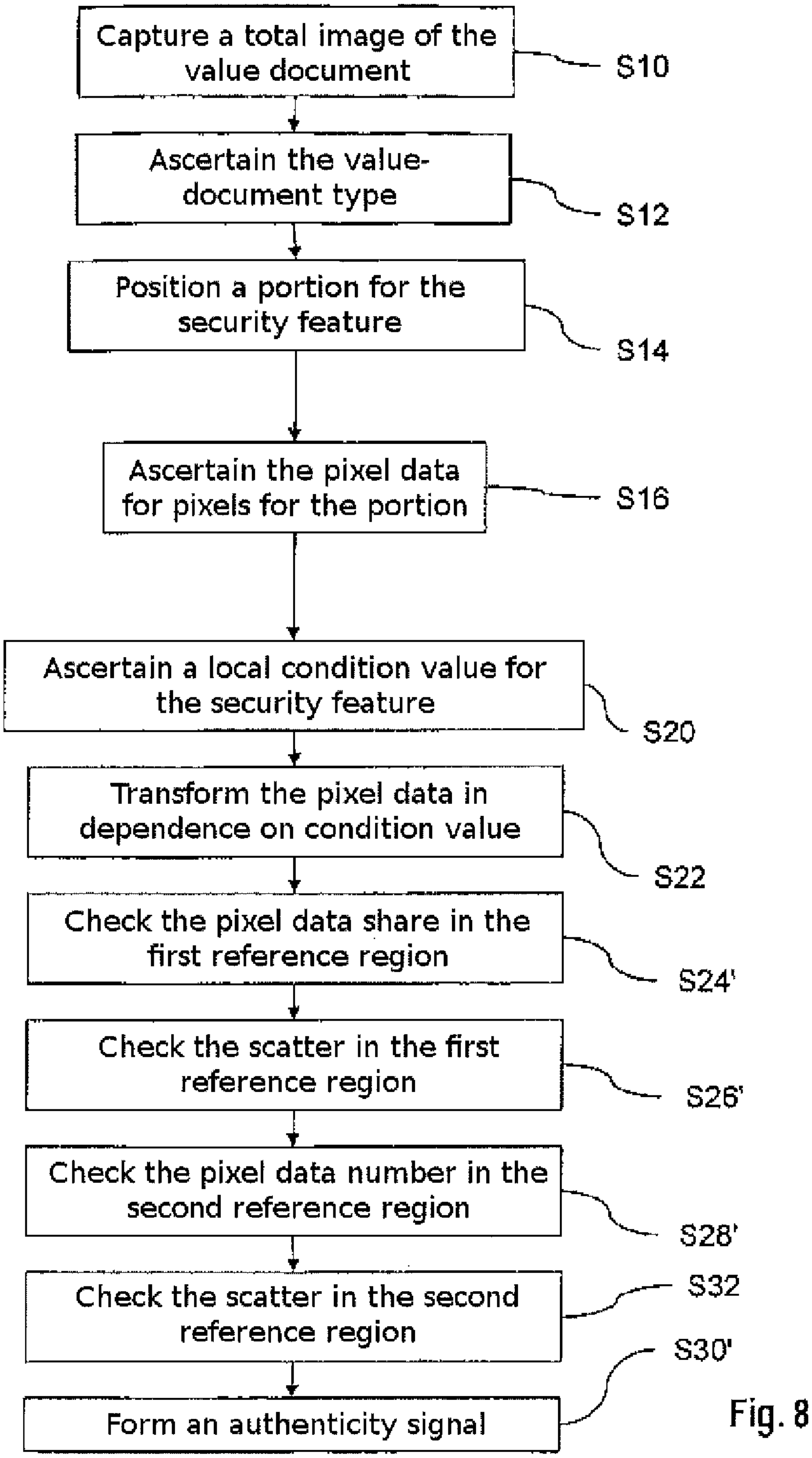

A third embodiment example in FIG. 8 differs from the first embodiment example, on the one hand, in that the evaluation device 31 carries out, as an additional step S32, a check of whether the scatter of the pixel data within the second reference region exceeds a second minimum scatter value prescribed for the security feature. The second minimum scatter value was previously specified analogously to the first minimum scatter value. There is employed here as a scatter measure the total variance in the G-IR plane, i.e. the sum of the variances of the G components and of the IR components of those pixel data lying in the second reference region. The second minimum scatter value can be ascertained analogously to the first embodiment example.

On the other hand, the evaluation device 31 executes, instead of the step S30, the step S30'. The latter differs from the step S30 solely in that the authenticity signal is so formed that it represents an indication of authenticity only when, in addition to the conditions in the first embodiment example, the scatter of the pixel data within the second reference region also exceeds the prescribed second minimum scatter value. This leads to a further increase in the exactness of checking in the case of optical security features also having a typical scatter in the G-IR properties.

Figure 9:
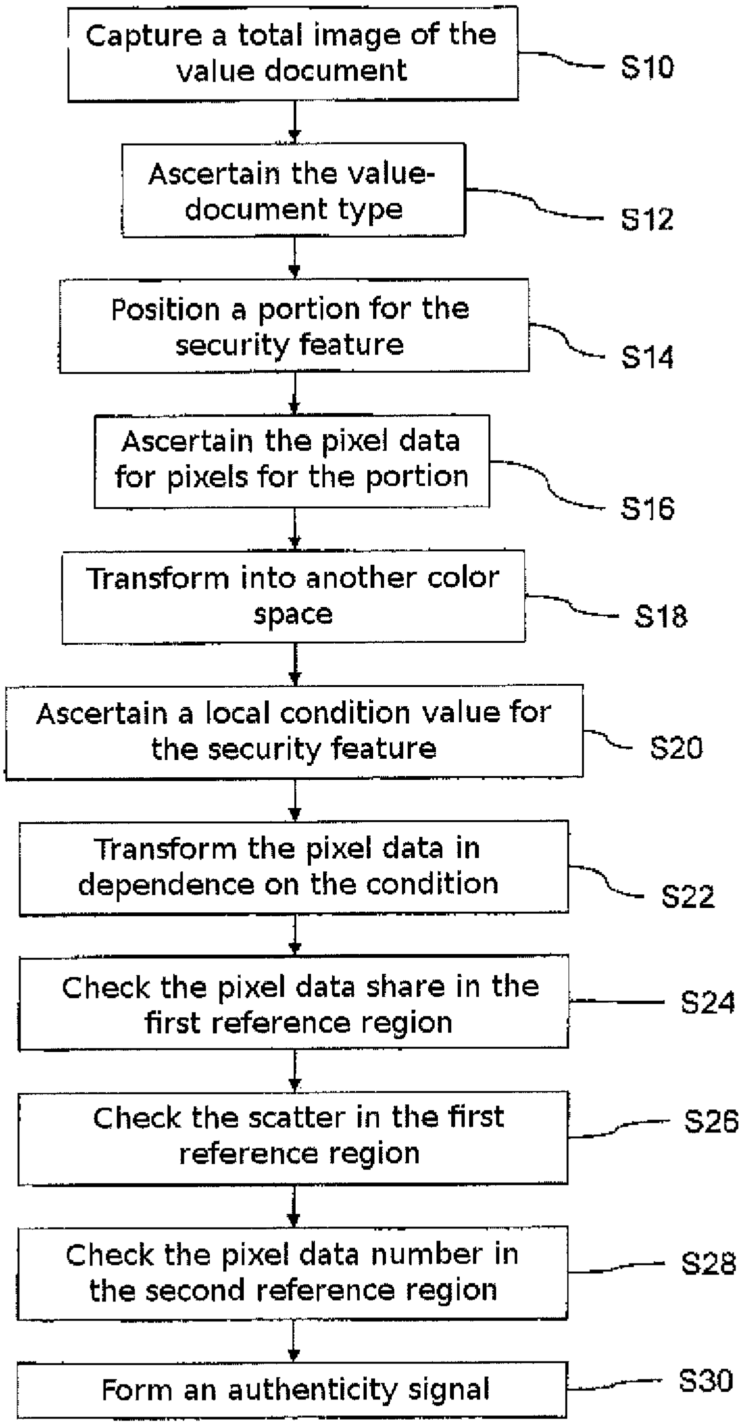
Figure 10:
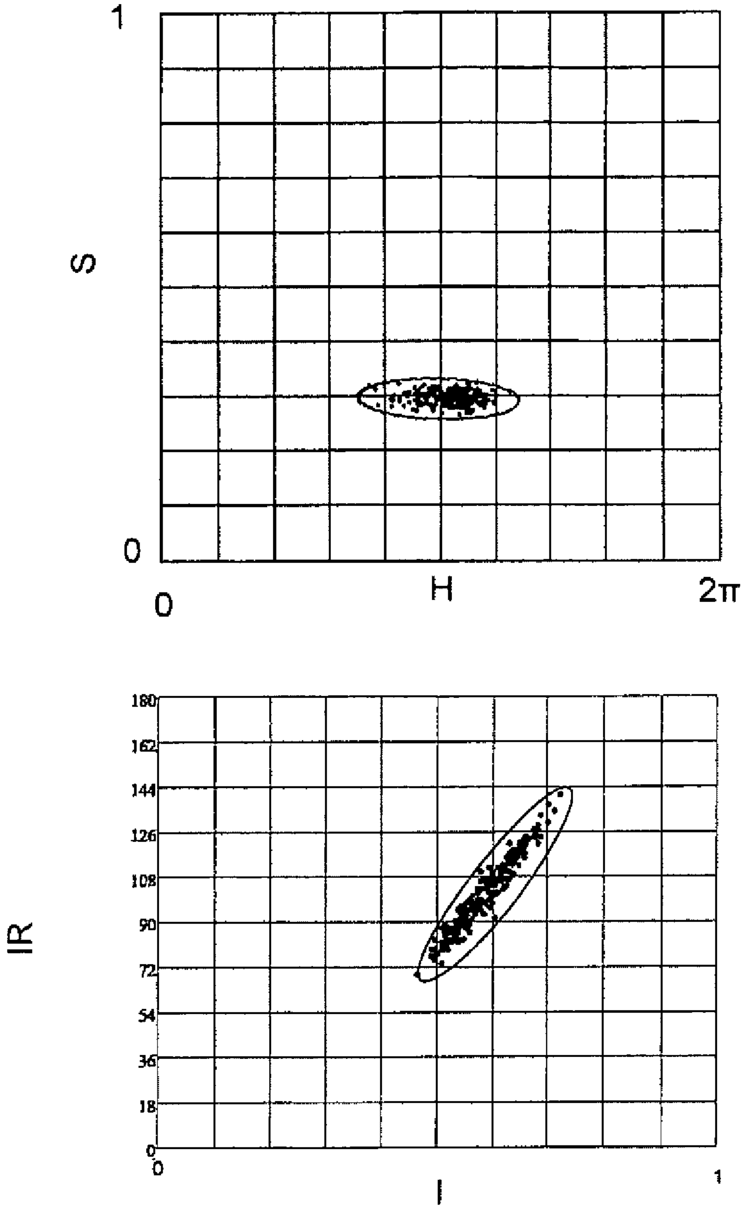

Further embodiment examples differ from the first embodiment examples in that there is provided a step S18 in which there is provided a transformation of the color components into another color space, in this example the HSI color space. FIG. 9 shows a corresponding variant of the first embodiment example, FIG. 10 a representation corresponding to FIG. 7.

The steps S22 to S30 are adapted to the other color space; in particular, the reference regions and the corresponding criteria are adapted accordingly. The same reference signs are hence employed for them in FIG. 9 as in the first embodiment example. As pixel data in the color space HSI there are now employed the hue H, the saturation S and the intensity I. The method steps S22 to S30 correspond formally to those of the corresponding steps of the first embodiment example, whereby a and b are replaced by H and S and the reference regions can be chosen for example according to FIG. 10.

Analogously, there result the embodiment examples corresponding to the second and third embodiment examples for the HSI color space.

Figure 11:
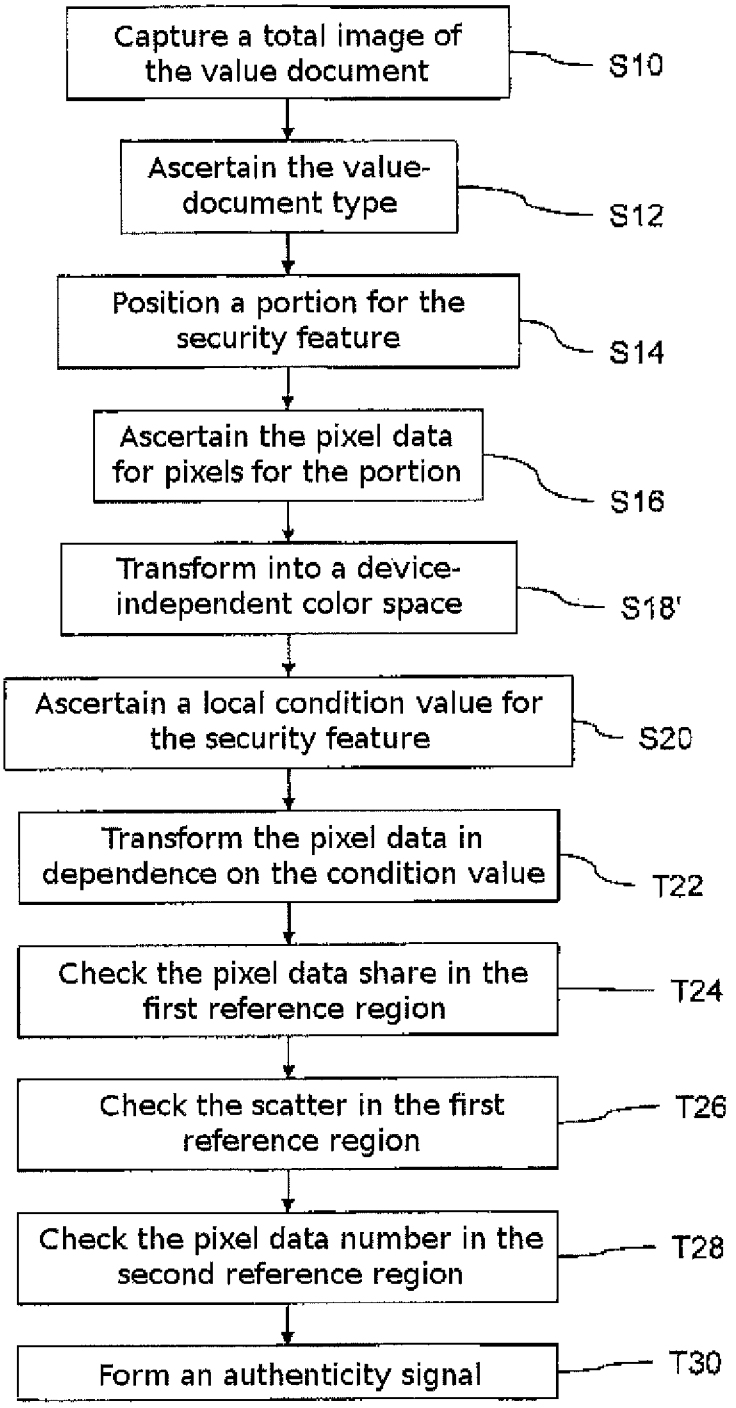
Figure 12:
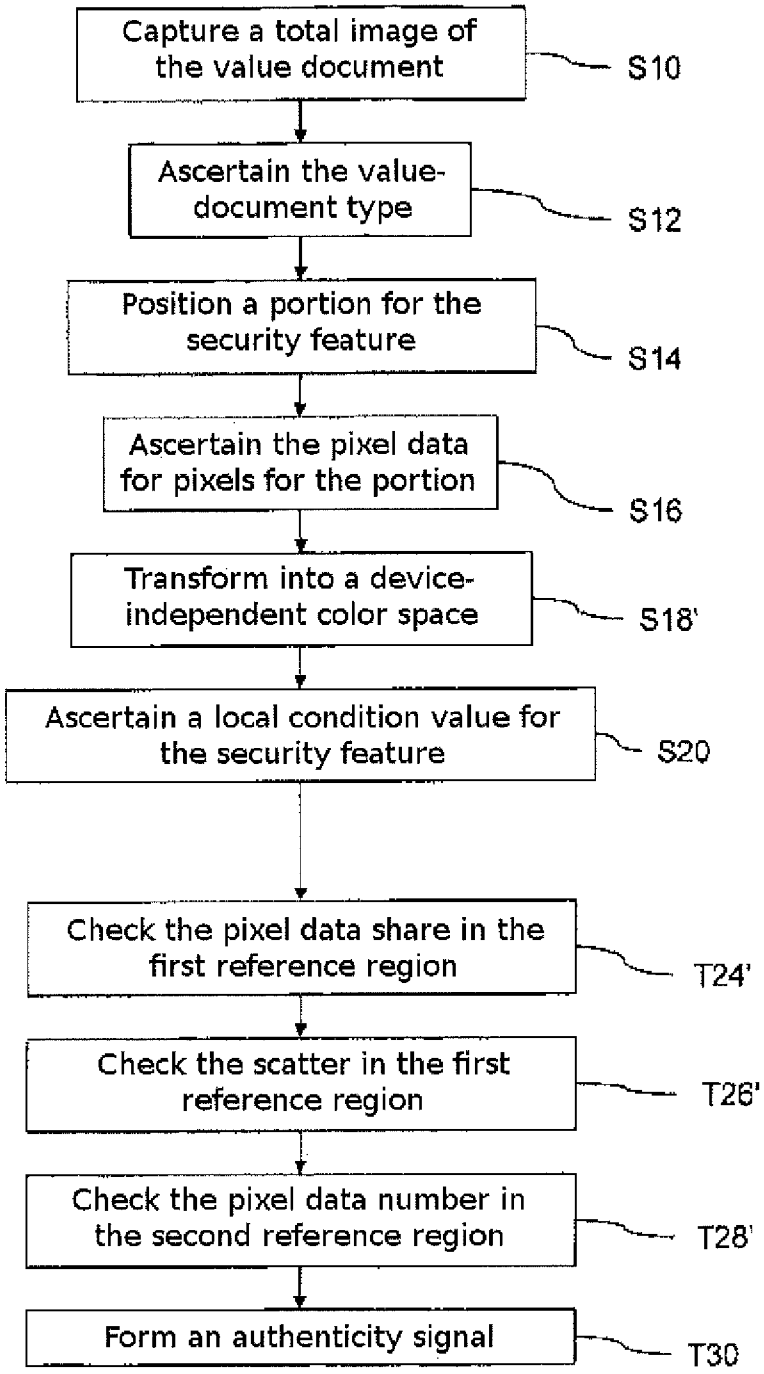
Figure 13:
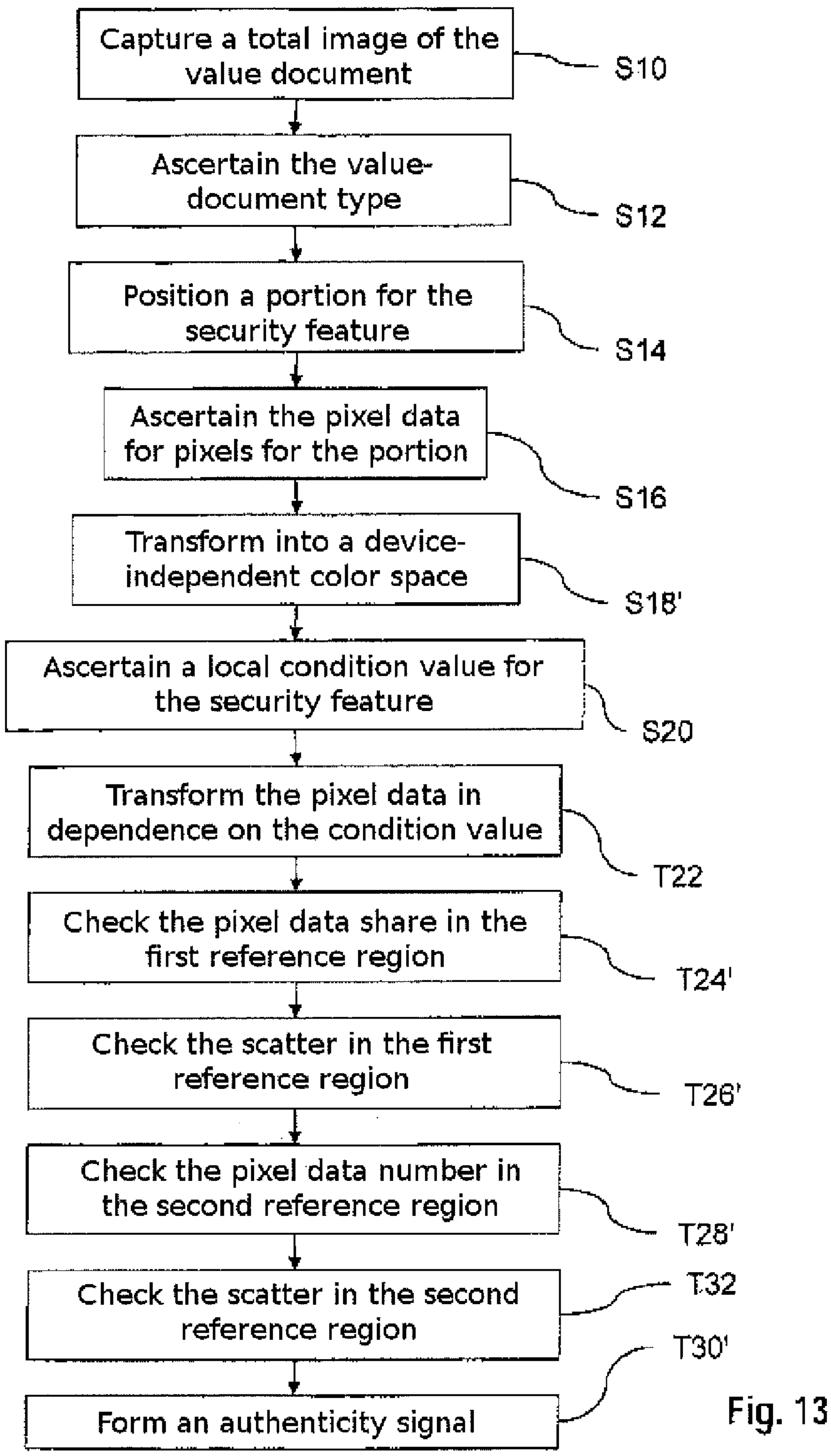

Further embodiment examples in FIGS. 11 to 13 differ from the preceding embodiment examples in that, on the one hand, the signal processing device 44 of the sensor, after calibration, can produce, and does produce, from detection signals of the detector rows 42, 42', 42" and 42'" color values which can be employed in good approximation as color coordinates in the standardized CIE XYZ color space. On the other hand, after the step S16 of the method there is respectively provided a step S18' in which the pixel data are transformed into a device-independent color space, in this example another CIE color space, so that the following steps are adapted accordingly, in particular through another statement of the reference regions and of the criteria.

In the basically optional, but advantageous step S18, the computer 34 transforms at least the pixel data for the portion into a device-independent color space, in this example the CIE Lab color space. In this example, all pixel data of the total image are transformed. In other embodiment examples, this step can also be carried out together with one of the preceding steps.

The pixel data in the CIE Lab color space are then employed for the following method steps. These steps are marked in the figures by the employment of a "T" instead of an "S", but do not differ from the steps of the above-described embodiment examples except for the employment of accordingly adapted reference regions and criteria for pixel data lying in the respective reference region.

Figure 14:
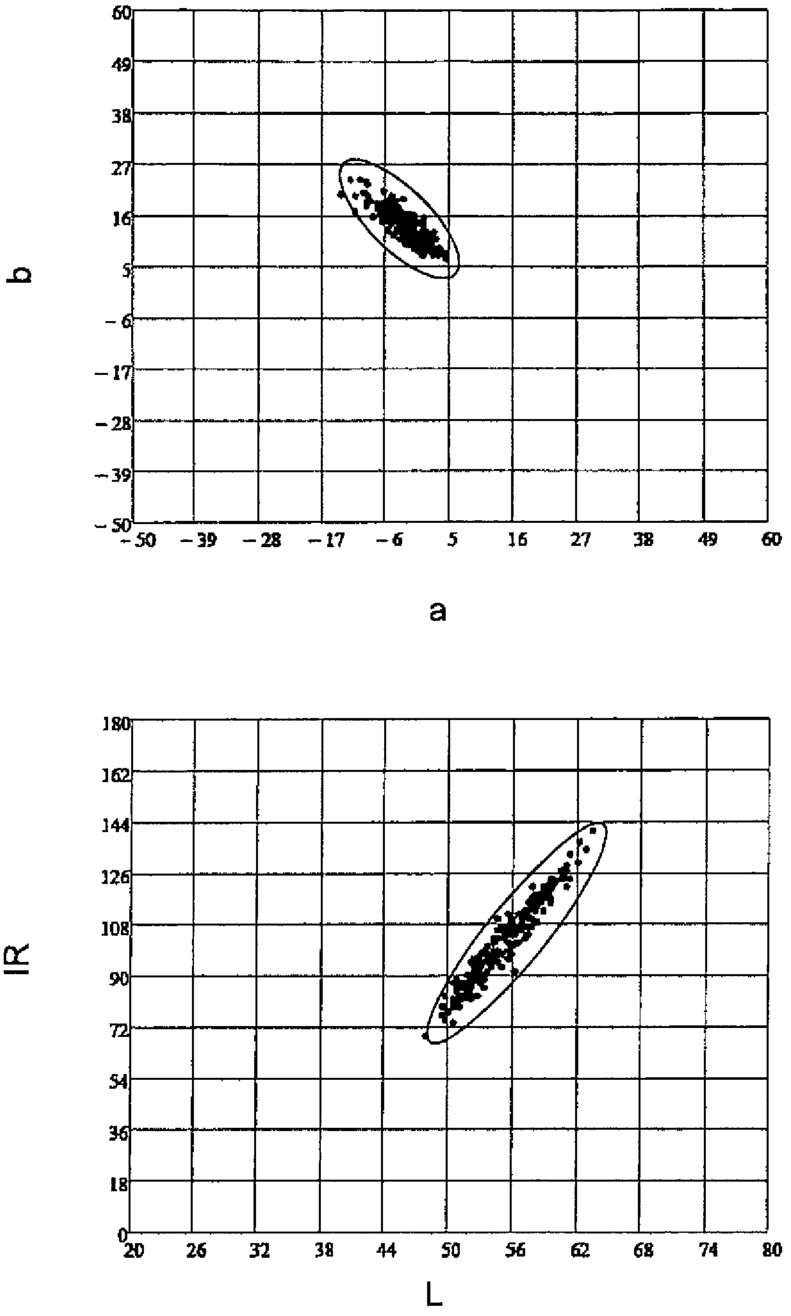

For checking the security feature, there are employed two reference regions in which pixel data should lie. The first reference region lies in the a-b plane of the CIE Lab color space (cf. FIG. 14*a*), the second in a plane that is spanned by the luminance axis of the CIE Lab color values and the IR remission axis (cf. FIG. 14*b*). In FIGS. 14*a* and 14*b* there are shown for a bank note the distributions of pixel data of pixels corresponding to an OVI region or a security feature with optically variable printing ink, in the a-b color plane and the L-IR plane. One can see a scatter, which is typical of the OVI element or the security feature with optically variable printing ink, of the pixel data lying within an elliptical curve which represents a curve of equal Mahalanobis distances. If a normal copier color were employed for forging the security feature, there could maybe result pixel data having the same mean value in the a-b plane, but not the characteristic scatter. The same holds in this example for the pixel data in the L-IR plane.

The reference regions and the parameters for the criteria were ascertained before execution of the method by capturing the pixel data for those pixels that are also employed upon the check, for freshly printed value documents as reference documents. For these pixel data, for ascertaining the respective reference region and the respective criterion according to which pixel data lie within the respective reference region, there are then ascertained the mean values of the a-b components or L-IR components and their variances and covariances assuming a normal distribution. The first reference region and the first criterion are then given by ascertaining, for the pixel data of a pixel that are relevant for the first criterion, the a and b components, the Mahalanobis distance in the a-b plane, and checking whether the Mahalanobis distance is smaller than a prescribed first maximum distance value. The parameters for computing the Mahalanobis distance depend in the known way on the previously ascertained mean values, variances and the covariances. Accordingly, the maximum distance value was ascertained on the basis of the reference documents. Analogously, the second reference region and the second criterion are given by ascertaining, for pixel data of a pixel, here the L and IR components, the Mahalanobis distance in the L-IR plane that is dependent on the corresponding mean values, variances and covariances, and checking whether the Mahalanobis distance is smaller than a prescribed second maximum distance value which was ascertained for the reference value documents. As a hit measure for the share of the pixel data lying within the respective reference region, the share itself is respectively employed in the present example. Hence, for each of the reference regions there is specified a minimum hit value which must be exceeded by the hit measure, i.e. here the share of the pixel data in the respective reference region, and which is characteristic of an authentic security feature or an authentic value document. Such a minimum hit value can be ascertained by analyzing the reference value documents and, if already known, forged value documents with the forged security feature.

In the embodiment example in FIG. 11, the scatter of the pixel data lying within the first reference region is additionally ascertained and compared with a minimum scatter value. As the scatter or scatter measure there is employed here the total variance, i.e. the sum of the variances of the a and the b component. For specifying the minimum scatter value, there is ascertained for each of the reference value documents, for the pixel data within the first reference region, as the first scatter measure the total variance, i.e. the sum of the variances of the a and the b component. From the distribution of the ascertained total variances there is then specified as the minimum scatter value a mean scatter value which must be exceeded by a first scatter measure ascertained for a security feature to be checked, in order that the security feature can be deemed authentic. Upon this specification there can also be employed the results for the scatter in forged value documents, if present.

For checking the security feature, the evaluation device 31 ascertains in step T24 which share of the pixel data for pixels corresponding to places in the portion 48 lie within the first reference region, by computing for each pixel the Mahalanobis distance in the a-b plane and comparing it with the maximum distance value. If the Mahalanobis distance is smaller than or equal to the maximum distance value, the pixel data lie in the first reference region, otherwise outside. After ascertaining the share, the share is compared with the prescribed first minimum hit value.

In the step T26, the evaluation device 31 or the processor 34 checks whether a first scatter of the pixel data lying within the first reference region is greater than a prescribed minimum scatter value. This sum is compared with the prescribed first minimum scatter value.

In step T28, the evaluation device 31 or the processor 34 then ascertains in accordance with step S24 the share of those pixel data of the pixels employed for checking the security feature, i.e. of the pixels in the portion 48 that lie within the second reference region, by respectively checking for the pixel data of a respective one of the pixels whether the Mahalanobis distance in the L-IR plane is smaller than the corresponding second maximum distance value. When the share is ascertained, the processor 34 checks whether it exceeds the corresponding second minimum hit value.

In step T30, the evaluation device 31 or the processor 34 forms an authenticity signal in dependence on the checks in the steps T24 to T28, as in the first embodiment example.

A second embodiment example in FIG. 12 differs from the embodiment example in FIG. 11 in that the step T22 is omitted and instead the steps T24 to T28 are replaced by the steps T24' to T28'.

These steps T24' to T28' differ from the steps T24 and T28 analogously to the second embodiment example only in that the parameters for the first and second criteria, and the first and second reference regions, are set in dependence on the local condition value. In particular, the parameters for determining the Mahalanobis distance, i.e. in particular the mean values, variances and covariances, can be functions of the local condition value. In this example, the local condition value can only assume two values, so that for each of the condition values only a corresponding parameter set needs to be stored; in dependence on the local condition value ascertained for the portion, the respective parameter set is then employed.

A further embodiment example in Fig. 13 differs from the first embodiment example, on the one hand, in that the evaluation device 31 carries out, as an additional step T32, a check of whether the scatter of the pixel data within the second reference region exceeds a second minimum scatter value prescribed for the security feature. The second minimum scatter value was previously specified analogously to the first minimum scatter value. As a scatter measure there is employed here the total variance in the L-IR plane, i.e. the sum of the variances of the L components and of the IR components of those pixel data lying in the second reference region. The second minimum scatter value can be ascertained analogously to the first embodiment example.

On the other hand, the evaluation device 31 executes instead of the step T30 the step T30'. This step differs from the step T30 analogously to the third embodiment example solely in that the authenticity signal is so formed that it represents an indication of authenticity only when, in addition to the conditions in the first embodiment example, the scatter of the pixel data within the second reference region also exceeds the prescribed second minimum scatter value. This leads to a further increase in the exactness of checking in the case of optical security features also having a typical scatter in the L-IR properties.

Further embodiment examples can differ from the previously described embodiment examples in that, in step S16, the portion is only a rectangle in a center of the security feature, but not the smallest rectangle surrounding the security feature.

In yet further embodiment examples there are employed pixel data that render only colors. The second criterion and the second reference region can then be given by the L component having to lie in a prescribed value range in order that the pixel data lie within the second reference region.

Yet further embodiment examples differ from the described embodiment examples in that there is employed as an optical security feature an embossed structure with a print formed on certain flanks of the embossed structure, the latter having an optically variable effect. Such embossed structures are described in the applications WO 97/17211 A1, WO 02/20280 A1, WO 2004/022355 A2, WO 2006/018232 A1 from the applicant.

Yet further embodiment examples differ from the described embodiment examples only in that there is employed as a sensor a sensor as is described in WO 96/36021 A1, whose content is incorporated in the description to this extent by reference.

Other embodiment examples differ from the described embodiment examples, in which the HSI or the CIE Lab color space are employed, in that only the first reference region is employed, so that the steps S28 or T28 can be omitted and the steps S30 or T30 are according changed, so that the authenticity signal is only formed when the number of the pixel data in the first reference region exceeds the minimum share value, and the scatter of the pixel data within the first reference region the first minimum scatter value.

Yet further embodiment examples differ from those described above in that no IR component is present. The second reference region is then one-dimensional, and the second criterion adapted accordingly.

In further embodiment examples, the evaluation device can be integrated into the sensor.

The invention claimed is:

1. A method for checking a prescribed optical security feature in or on a prescribed portion of a value document on the basis of pixel data of pixels of an image of the prescribed portion which are respectively associated with places in or on the portion and render optical properties of the value document at the places, comprising the steps:

checking whether a first number of said pixels, or a first share of said pixels in the pixels of the image, whose pixel data, according to a first prescribed criterion, lie within a first reference region prescribed for the security feature exceeds a first minimum hit value prescribed for the security feature, and to determine whether the pixel data in the first reference region are concentrated only in a part of the first reference region or are rather distributed in a wider scatter therein, checking whether a first scatter of the pixel data of those pixels lying within the first reference region for the pixel data according to the first criterion exceeds a first minimum scatter value prescribed for the security feature, and in dependence on the result of checking, generating an authenticity signal which represents an indication of authenticity only when the first number or first share exceeds the first minimum hit value, and the scatter the first minimum scatter value.

2. The method according to claim 1, including checking whether a second number of said pixels, or a second share of said pixels in the pixels of the image, whose pixel data, according to a second criterion, lie within a second reference region prescribed for the security feature exceeds a second minimum value prescribed for the security feature, and generating the authenticity signal so that it represents the indication of authenticity only when additionally the second number or second share exceeds the second minimum hit value.

3. The method according to claim 1, wherein the pixel data for a respective pixel or place have components that render remission or transmission properties in at least two different wavelength ranges.

4. The method according to claim 1, wherein the pixel data for a respective place have components that represent remission and/or transmission properties in at least two different wavelength ranges within the visible spectral region, or colors, and either or both remission and transmission properties in a further wavelength range at least partly outside the visible spectral region.

5. The method according to claim 3, wherein the pixel data representing properties in the visible spectral range or color values are transformed, before checking, into a device-independent color space, or there are employed, as pixel data representing properties in the visible spectral range or color values, pixel data in a device-independent color space.

6. The method according to claim 3, wherein there is employed as the first reference region a region extending at least in a plane which extends parallel to two axes of a color space which correspond to different colors.

7. The method according to claim 2, wherein there is employed as the first or second reference region a region extending at least in a plane which extends parallel to an axis corresponding to a luminance or brightness, and an axis corresponding to a brightness in the further wavelength range at least partly outside the visible spectral region.

8. The method according to claim 1, wherein there is employed as either or both the first and second scatter either or both a variance and a covariance of the pixel data lying in the first or second reference region, or components of the pixel data or a monotonic function of the variance or covariance.

9. The method according to claim 1, wherein there are employed edge image pixel data of pixels of an edge image portion which are respectively associated with places within a prescribed edge region along at least a part of an edge of the portion, there is ascertained from the edge pixel data a local condition value rendering the condition of the value document in the portion, and the local condition value is employed upon the checking of either or both the first and second share or either or both first and second number and/or the first and/or second scatter.

10. The method according to claim 9, wherein pixel data are corrected before checking.

11. The method according to claim 9, wherein the first criterion and/or the first reference region and/or the second criterion and/or the second reference region are changed or prescribed in dependence on the local condition value.

12. The method according to claim 1, wherein the security feature is a security feature with optically variable printing ink.

13. The method according to claim 1, wherein the security feature is a surface structure which has an optically variable effect.

14. The method according to claim 13, wherein the embossed structure has bent or angled embossed structure elements.

15. A method for checking a prescribed optical security feature in or on a prescribed portion of a value document, wherein, for capturing an image of the prescribed portion, the value document is illuminated with optical radiation of an optical radiation source, and radiation emanating from the value document is captured, comprising the steps forming, in dependence on the captured radiation, pixel data of pixels of the image which are respectively associated with places in or on the portion and render optical properties of the value document at the places, and wherein the method according to claim 1 is carried out, and wherein there are employed as pixel data said formed pixel data.

16. The method according to claim 15, wherein the illuminating with optical radiation and the capturing of radiation are so effected that the pixel data for a respective pixel or place have components that render remission or transmission properties in at least two different wavelength ranges or at least two colors.

17. The method according to claim 15, wherein the illuminating with optical radiation and the capturing of radiation are so effected that the pixel data for a respective pixel or place have components that represent either or both remission and transmission properties in at least two different wavelength ranges within the visible spectral region or at least two colors, and either or both remission and transmission properties in a further wavelength range at least partly outside the visible spectral region.

18. The method according to claim 15, including transporting the value document past an illumination source and illuminating the document with a convergent bundle of optical radiation only from one illumination direction, and the radiation emanating from a respectively illuminated place is captured only from one capture direction.

19. The method according to any of claims 15, wherein upon the capture of the radiation emanating from the value document, there are formed edge image pixel data which are respectively associated with places within a prescribed distance from an edge of the portion and render optical properties of the value document at the places.

20. A non-transitory computer program product with program code stored on a computer-readable data carrier, which is configured to carry out the method according to claim 1 when the computer program product is executed on a computer.

21. A checking device for checking a prescribed security feature of a value document by the method according to claim 1, comprising an optical sensor that captures an image with pixels whose pixel data are respectively associated with places in or on the portion and render optical properties of the value document at the places, and a computer configured to execute a computer program with images captured by the sensor.

22. The checking device according to claim 21, wherein the optical sensor is configured for locally resolved capturing of remission and/or transmission properties, or remission or transmission images, in at least two different wavelength ranges or at least two colors, and forming pixel data rendering these properties.

* * * * *